March 29, 1932.  F. S. BOARDMAN  1,851,537
BRUSH MAKING MACHINE
Filed July 30, 1923  2 Sheets-Sheet 1
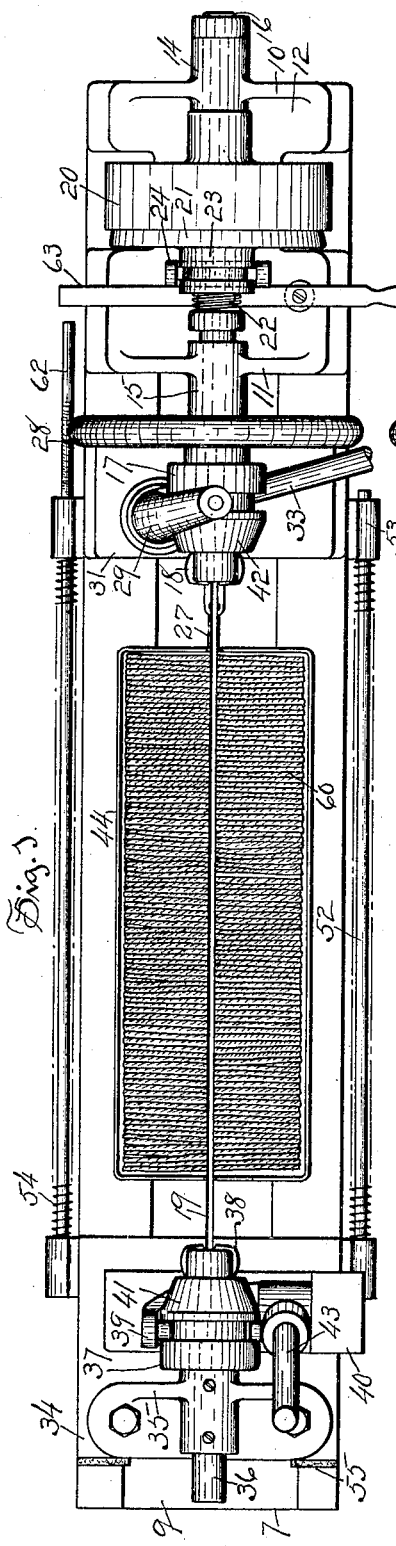
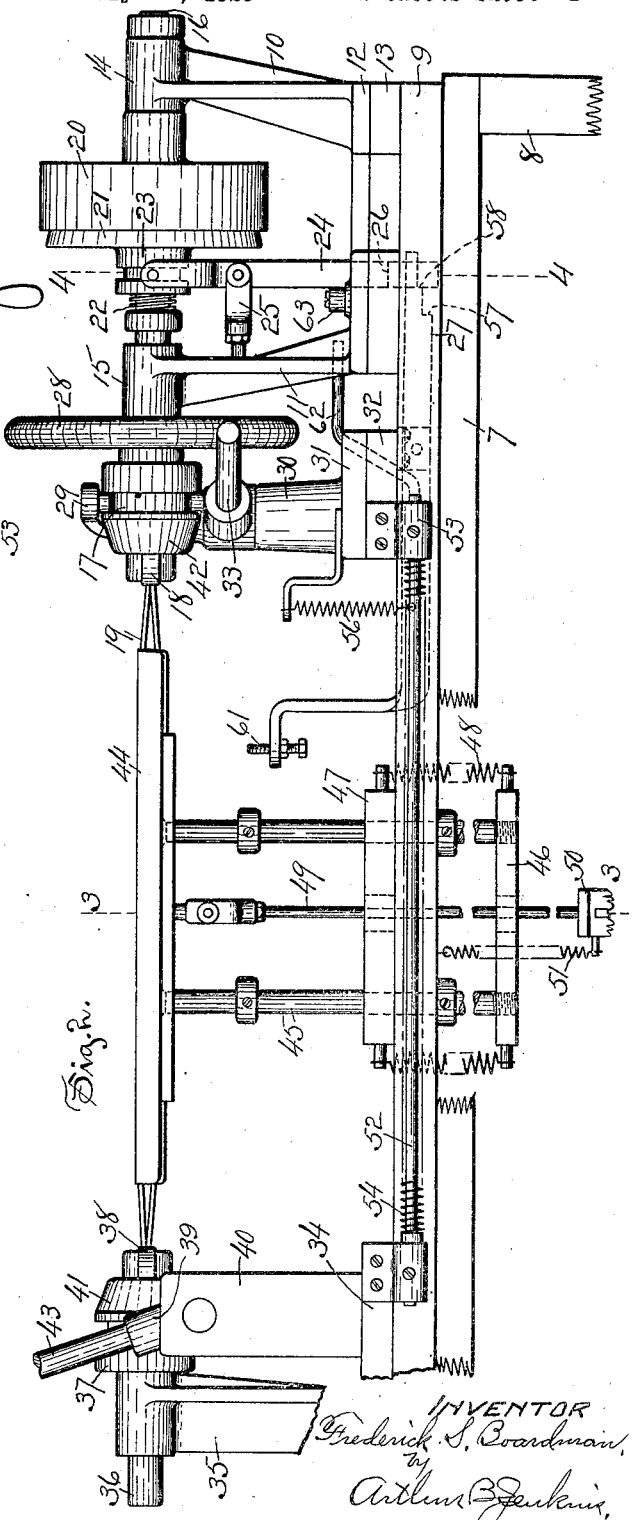
INVENTOR
Frederick S. Boardman
by
Arthur B Jenkins
ATTORNEY

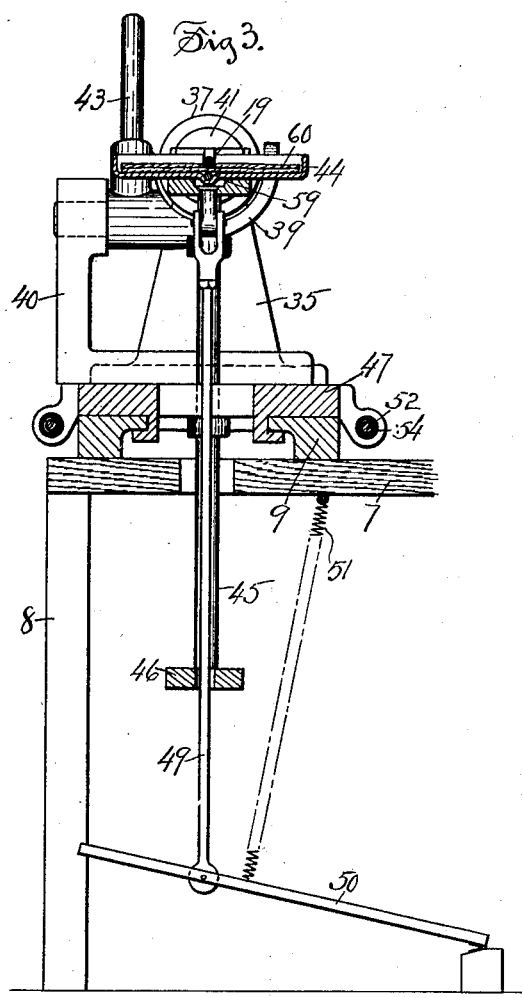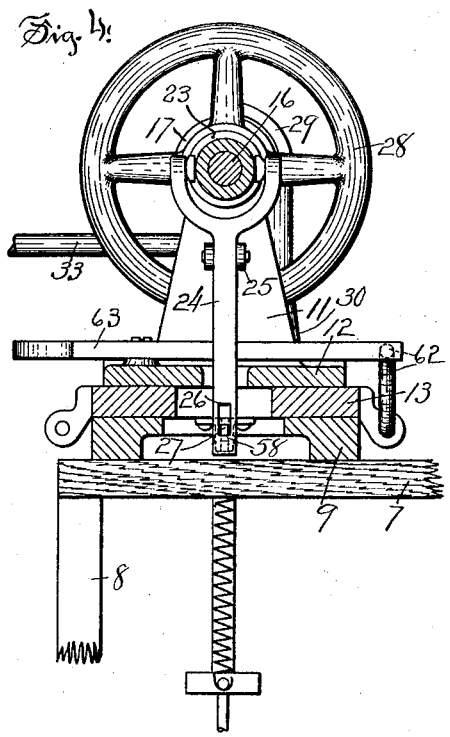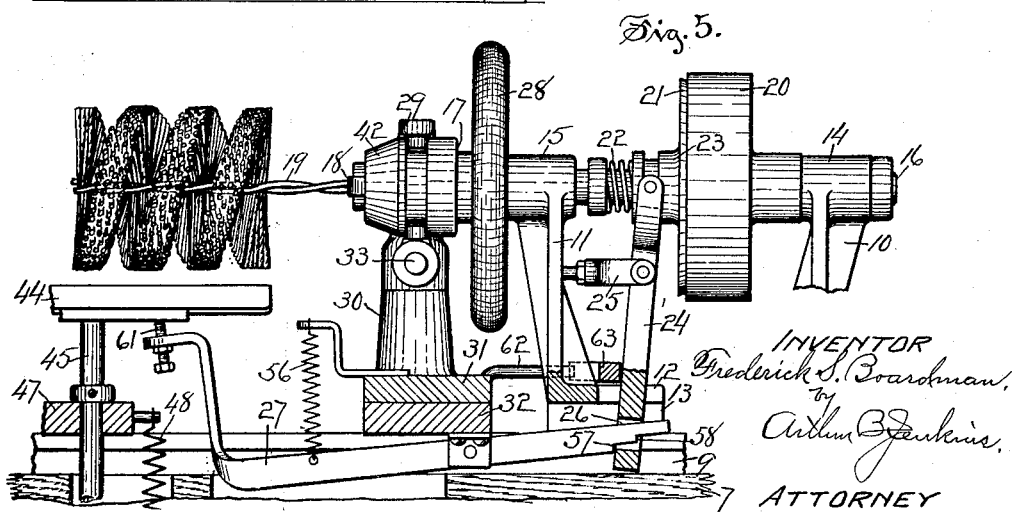

Patented Mar. 29, 1932

1,851,537

UNITED STATES PATENT OFFICE

FREDERICK S. BOARDMAN, OF HARTFORD, CONNECTICUT, ASSIGNOR TO THE FULLER BRUSH COMPANY, OF HARTFORD, CONNECTICUT, A CORPORATION OF CONNECTICUT

BRUSH MAKING MACHINE

Application filed July 30, 1923. Serial No. 654,672.

My invention relates to the class of machines employed for forming the body of a brush or similar article by securing it to a core in the operation of twisting the latter, and an object of my invention, among others, is to provide a machine of this class that shall be extremely simple in construction and that shall require little skill in distributing the material forming the body of the article, and a further object is to provide a machine of this class that shall be more or less automatic in its action.

One form of machine embodying my invention and in the construction and use of which the objects herein set out, as well as others, may be attained, is illustrated in the accompanying drawings, in which—

Figure 1 is a plan view of my improved twisting machine.

Figure 2 is a view in front elevation of the same with parts broken away to show construction.

Figure 3 is a view in vertical cross section through the machine on a plane denoted by the dotted line 3—3 of Figure 2.

Figure 4 is a similar view on a plane denoted by the dotted line 4—4 of Figure 2.

Figure 5 is a detail view in vertical section through a portion of one end of the machine, the view being from the front and showing the position of parts with a brush partially twisted.

In the accompanying drawings the numeral 7 indicates the table of my improved machine that may be supported upon legs 8 and that may be composed of any desired material and of any suitable form. A head stock is mounted at one end of the table and a tail stock is mounted at the opposite end of said table, said head and tail stocks being supported above and by a base plate 9 having a slot or slots extending lengthwise thereof and through which operative parts of the machine may extend.

The head stock comprises brackets 10—11 rising from a base 12 mounted upon and secured to a spacer 13. The brackets 10—11 are formed with bearings 14—15 at their upper ends for a spindle 16 having a head chuck 17 secured to one end. This chuck may be of any suitable construction comprising chuck jaws 18 to grasp and hold wires 19 to be twisted in the operation of the machine. A clutch member 20 is loosely mounted on the spindle 16 and a clutch member 21 is splined to the spindle, these clutch members being of any suitable arrangement to cause them to engage each other and thereby rotate the spindle when the member 21 is forced against the member 20 as by a clutch spring 22. A hub 23 is formed on the shiftable clutch member 21, a groove in this hub being engaged by pins from opposite sides of the fork of a clutch lever 24 pivotally mounted on a support 25 projecting from the bracket 11, and as shown in Figure 2 of the drawings. The clutch lever 24 projects through openings in the base 12, the spacer 13 and the base plate 9, said clutch lever having a hole 26 to receive a clutch controlling lever 27 to be hereinafter described. A hand wheel 28 is secured to the spindle 16 as a means for manual operation thereof.

The head chuck 17 is manually operated as by means of a yoke 29 pivotally mounted on a standard 30 rising from a standard base 31 supported on a spacer 32 on the base plate 9, a handle 33 projecting from the yoke as a means for the manual operation thereof.

The tail stock comprises a slide plate 34 mounted for sliding movement on the base plate 9, a bracket 35 being secured to said slide plate and having at its upper end a socket for a stub shaft 36 that is secured in said socket. A tail chuck 37 is supported on the shaft 36 and has jaws 38 to grasp and hold the wires 19, said chuck being of any ordinary and well known construction. A yoke 39 is pivotally mounted on a bracket 40 mounted upon and secured to the slide plate 34, said yoke having pins engaging a groove in a chuck sleeve 41 of the tail chuck 37, it being here remarked that the head chuck has a similar sleeve 42 for its operation. A handle 43 is secured to the yoke as a means for manual operation thereof.

A tray or pan 44 is supported between the head and tail chucks upon supporting rods 45 that extend downwardly to a cross head 46 located underneath the table 7, and as shown in Figures 2 and 3 of the drawings. These rods extend through a guide plate 47 mounted upon the base plate 9, and springs 48 are employed to hold the guide and pan in their uppermost positions. A tray operating rod 49 is pivotally secured to the under side of the tray 44 and extends downwardly through the guide plate 47, the base plate 9, and the table 7, and also through the cross head 46 to a treadle 50 pivotally supported underneath the machine in convenient position for the foot of the operative. The treadle is urged upwardly as by means of a spring 51.

Slide actuating rods 52 are secured at one end to the slide plate 34, as shown in Figures 1 and 2 of the drawings, these actuating rods extending through guides 53 on opposite edges of the spacer 32. The slide plate 34 is urged to its backward position as by means of springs 54 supported upon the rods 52, a stop 55 being employed to limit the backward movement of the slide plate 34, and, therefore, determine the rearward position of the tail chuck.

The means for forcing the slide plate into backward position may be differently arranged or other means may be employed as may be desired.

The clutch controlling lever 27 hereinbefore referred to is pivotally mounted underneath the spacer 32, as shown in Fig. 5 of the drawings, the lever being urged as by a spring 56 into contact with the under side of the tray or pan 44, the lever being suitably bent to enable such engagement. The opposite end of the lever is provided with a stop shoulder 57 and a clutch retaining shoulder 58, this end of the lever extending through the hole 26 and said shoulders being adapted to engage the clutch lever 24 at the edge of said hole. The pan 44 is preferably provided with a groove 59 in its bottom to receive one of the wires to be twisted. A stop screw 61 is secured in the end of the clutch controlling lever 27 to make contact with the bottom of said pan.

The end of one of the rods 52, the one located at the back of the machine in the construction herein shown, is provided with a stop finger 62 that is offset from the main part of the rod and in position to come in contact with the end of a stop lever 63 pivotally mounted on the base of the bracket 11 and in position to make contact with the lower end of the clutch lever 24.

In the operation of the device the pan 44 being in its uppermost position, as shown in Figure 2 of the drawings, and the chuck jaws being open and the clutch members being separated and held in a manner to be hereinafter described, a wire 19 is placed in the groove 59 and between the jaws of both the tail and head chucks. Materials 60 to be twisted between the wires is evenly spread by hand upon the bottom of the pan and upon the wire 19 that has been placed in the groove in said pan, as above described. A second wire is now placed upon the material and the handles 33 and 43 are operated to move the yokes and thereby the chuck sleeves 41 and 42 to close the chuck jaws upon the wires.

The treadle 50 is now pressed downwardly, as by the foot of the operative, this movement lowering the pan 44 away from the path of the material 60 when it shall be rotated. As the pan moves downwardly it comes in contact with the stop screw 61 in the lever 27, moving this end of the lever downwardly and raising its opposite end to disengage it from the stop lever 24. Before movement of the lever the shoulder 58 was in contact with the edge of the opening in the clutch lever 24 thus holding the clutch parts disengaged, as hereinbefore referred to, and the spindle 16 is, therefore, still. As the lever 27 is moved as just described the clutch lever 24 is released and the spring 22 operates to force the clutch members into engagement and, therefore, rotate the shaft 16, it being understood that a belt passes around the clutch member 20 as a means for operating it.

The twisting operation is now effected and in this twisting operation the tail stock is moved toward the head stock owing to the shortening of the wires caused by the twisting thereof. In this movement of the tail stock and consequently of the rod 52 bearing the stop finger 62, said finger engages with its end the stop lever 63. As the stop finger engages said lever it swings said lever on its pivot against the clutch lever 24 thus operating the clutch lever to disengage the clutch members against the tension of the spring 22, and when the clutch lever 24 has been moved sufficiently it will be in position for engagement by the shoulder 58 on the clutch controlling lever 27, in which position it will be held by the stop finger 62 pressing against the stop lever 63.

The treadle 50 is now released and the spring 56 operates to move the lever 27 so that the stop screw 61 will follow the upward movement of the pan 44 and the opposite end of the clutch controlling lever being consequently moved downwardly the shoulder 58 comes in contact with the edge of the opening in the clutch lever 24 and thus retains the clutch members in their disengaged relation. The head and tail chuck jaws are now released by manual operation of the handles 33 and 43, one pair of jaws being released before the other. Upon the first release of one of the sets of chuck jaws the springs 54 will move the slide plate 34 backwardly against the stop 55 and the finger 62 will, therefore, be carried away and disengaged from the stop lever 63, said lever being thus released, but the clutch lever 24 being held by engagement with the shoulder 58 to retain the clutch members in their disengaged positions, and both pairs of chuck jaws having been released, as hereinbefore described, the twisted brush may be removed and the parts of the machine are left in position for a repetition of the operation.

In accordance with the provisions of the patent statutes I have described the principles of operation of my invention, together with the machine which I now consider to represent the best embodiment thereof; but I desire to have it understood that the device shown is only illustrative, and that the invention may be carried out by other means and applied to uses other than those above set out.

While a clutch device is illustrated herein as being operated by a movable table or support no claim is made herein to such a structure since, broadly, the said invention is not mine and is embodied in the Anton Van Veen Patent No. 1,691,094, granted Nov. 13, 1928, applicant's broad invention being directed to the movable table or support per se.

I claim—

1. A brush making machine including spaced means for holding and twisting core elements, mechanism for operating said holding and twisting means, a support positioned to receive brush material spread upon a core element which is subsequently with another core element held by said holding and twisting means, and means for changing the relative positions of said support and said holding and twisting means to create a space between said support and core elements.

2. A brush making machine including spaced means for holding and twisting core elements, mechanism for operating said holding and twisting means, a support mounted to move to and from a position between said holding and twisting means to support brush material spread upon a core element which with another core element is subsequently held by said holding and twisting means, and means for operating said support to impart said movement thereto.

3. A brush making machine including spaced means for holding and twisting core elements, mechanism for operating said holding and twisting means, a support movably mounted between said holding and twisting means to support brush material spread upon a core element which is subsequently with another core element held by said holding and twisting means, a rod upon which said support is mounted, means to move said rod in one direction, and means for moving said rod in the opposite direction.

4. A brush making machine including spaced means for holding and twisting core elements, mechanism for operating said holding and twisting means, a support mounted to move to and from a position between said holding and twisting means to support brush material spread upon a core element which is subsequently with another core element held by said holding and twisting means, said support having a groove to receive a core element, and means for operating said support to move it with respect to said holding and twisting means.

5. A brush making machine including spaced means for holding and twisting core elements, said means including a rotatable spindle mounted upon a head stock and a movably mounted tail stock carrying one of said holding means, a rod secured to said tail stock, a stop for determining the rearward position of said tail stock, a spring carried by said rod to force said tail stock away from the head stock and to its normal and rearward position when the holding and twisting means are released, a tray mounted to move to and from a position between said holding and twisting means to receive material spread upon a core member which is subsequently with another core member held by said holding and twisting means, and means for operating said tray.

6. A brush making machine including spaced means for holding and twisting core elements, said means including a rotatable spindle mounted upon a head stock and a tail stock to hold the core elements to be twisted, starting and stopping mechanism for said spindle, one of said stocks being slidably mounted with respect to the other, a guide rod secured to said slidable stock, a finger on said guide rod operative on a member of said starting and stopping mechanism to effect operation of the latter as the wire is shortened in the twisting operation, a spring compressed upon said guide rod to force said slidable stock away from the other stock and to its normal position when the holding and twisting means are released, a tray mounted to move to and from a position between said holding and twisting means to receive material spread upon a core member which is subsequently with another core member held by said holding and twisting means, and means for operating said tray.

7. A brush making machine including spaced means for holding and twisting core elements, mechanism for operating said holding and twisting means, a support positioned to receive brush material spread upon a core element which is subsequently with another core element held by said holding and twisting means, means for changing the relative positions of said support and said holding and twisting means to create a space between said support and core elements, a clutch controlling lever with one end located in the path of movement of said support, a clutch lever engaged with the opposite end of said controlling lever, and a clutch with which said clutch lever is engaged.

8. A brush making machine including spaced means for holding and twisting core elements, one of said means including a rotatable spindle and the other including a movably mounted support, a clutch to control operations of said spindle, a clutch lever engaged at one end with said clutch, a clutch controlling lever adapted to engage the opposite end of said clutch lever, a support positioned to receive brush material spread upon a core element which is subsequently with another core element held by said holding and twisting means, means for changing the relative positions of said support and said holding and twisting means to create a space between said support and core elements and to engage said clutch controlling lever for actuation thereof, and a rod projecting from said movably mounted support to engage said clutch lever for operation thereof.

FREDERICK S. BOARDMAN.